United States Patent [19]
Larson et al.

[11] Patent Number: 5,533,780
[45] Date of Patent: Jul. 9, 1996

[54] FRONT CROSSMEMBER ASSEMBLY FOR A MOTOR VEHICLE

[75] Inventors: Pamela E. Larson, New Baltimore; John D. Nulty, South Lyon, both of Mich.

[73] Assignee: Chrysler Corporation, Auburn Hills, Mich.

[21] Appl. No.: 353,646

[22] Filed: Dec. 8, 1994

[51] Int. Cl.$^6$ ................................................ B60K 11/04
[52] U.S. Cl. ........................................ 296/194; 180/68.4
[58] Field of Search ........................... 296/194, 204, 296/203, 29, 30; 180/68.4

[56] References Cited

U.S. PATENT DOCUMENTS

| | | | |
|---|---|---|---|
| 4,240,517 | 12/1980 | Harlow, Jr. et al. | 180/295 |
| 4,822,096 | 4/1989 | Fujii | 296/194 |
| 5,077,885 | 1/1992 | Kanemitsu et al. | 29/430 |
| 5,303,973 | 4/1994 | Fujii | 296/194 |
| 5,348,114 | 9/1994 | Yamauchi | 180/291 |

*Primary Examiner*—David M. Mitchell
*Assistant Examiner*—Kia M. Robinson
*Attorney, Agent, or Firm*—Thomas G. Pasternak

[57] ABSTRACT

A front crossmember assembly for a motor vehicle. The crossmember assembly serves to support the vehicle radiator, and provides attachments for the front of the vehicle engine, the front recovery bracket, the front fascia and splash shield, along with providing torsional stability to the vehicle front end. The spot welded assembly itself is bolted into the vehicle body, along with the radiator and associated cooling module, built-up, charged and sealed before insertion into the vehicle body, thereby facilitating plant assembly and, where necessary, plant repair, reducing part complexity, vehicle weight, and potential service problems.

9 Claims, 4 Drawing Sheets

FRONT CROSSMEMBER ASSEMBLY FOR A MOTOR VEHICLE

TECHNICAL FIELD

This invention relates generally to a motor vehicle front crossmember assembly and, more particularly, to such a crossmember assembly which serves to support the vehicle radiator, and provide attachments for the front of the vehicle engine, the front fascia and splash shield, along with providing torsional stability at the front of the vehicle.

BACKGROUND ART

Patents which are known to disclose front crossmembers and or powertrain cradles include Yamauchi U.S. Pat. No. 5,348,114; Kanemitsu et al U.S. Pat. No. 5,077,885; Fujii U.S. Pat. Nos. 4,822,096 and 5,303,973; Harlow et al U.S. Pat. No. 4,240,517; and U.S. Pat. No. 5,375,870 assigned to the assignee of the present invention.

DISCLOSURE OF THE INVENTION

A general object of the invention is to provide an improved vehicle front support member.

Another object of the invention is to provide a vehicle front support member which primarily supports the vehicle radiator, while also providing attachments for supporting the front of the engine, as well as the front fascia, the splash shield, the front recovery bracket.

A further object of the invention is to provide a front support member for a vehicle radiator, which is bolted onto the vehicle body as a unit.

A still further object of the invention is to provide a support member for the front of the engine, which becomes the forward-most cross-car member of the powertrain cradle and provides torsional stability at the vehicle front end.

These and other objects and advantages will become more apparent when reference is made to the following drawings and the accompanying description.

BEST MODE OF CARRYING OUT THE INVENTION

Figure 1:
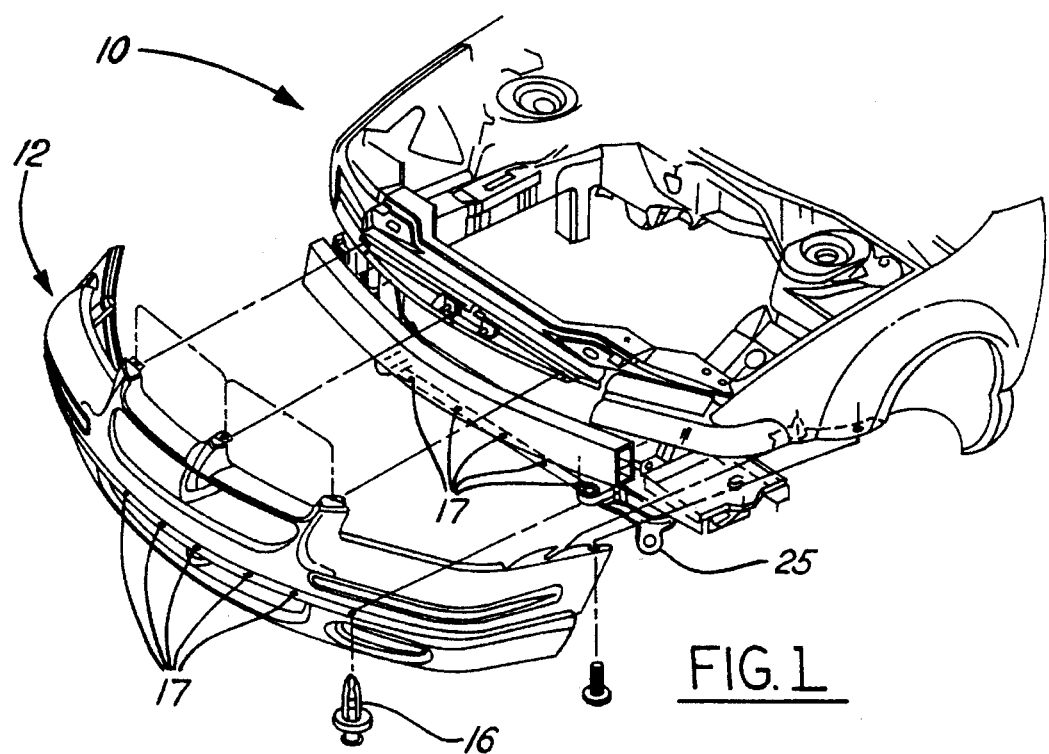
FIG. 1 is a fragmentary, perspective, exploded view of the front end of a vehicle body embodying the invention.

Referring now to the drawings in greater detail, FIG. 1 illustrates a front vehicle body 10 including a front fascia and splash shields 12 attached to a crossmember assembly 18 by fasteners 16 through holes 17.

Figure 2:
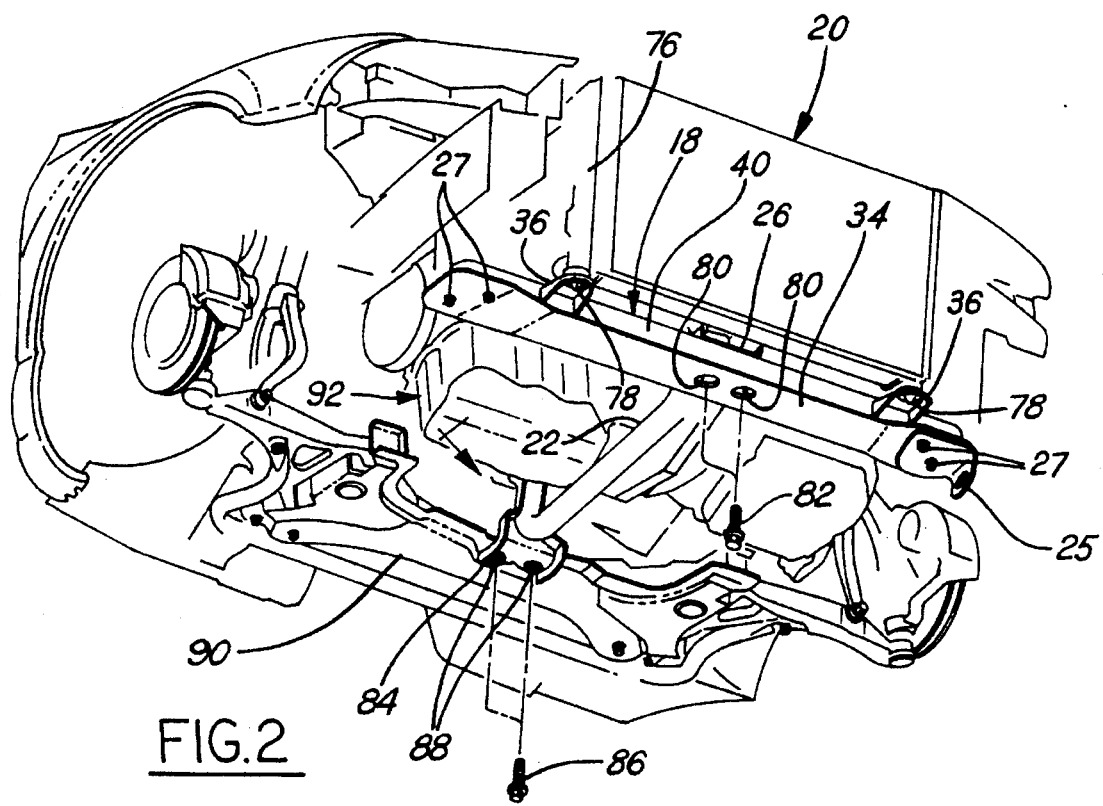
FIG. 2 is a perspective view of the bottom surface of a vehicle front end assembly embodying the invention.
Figure 4:
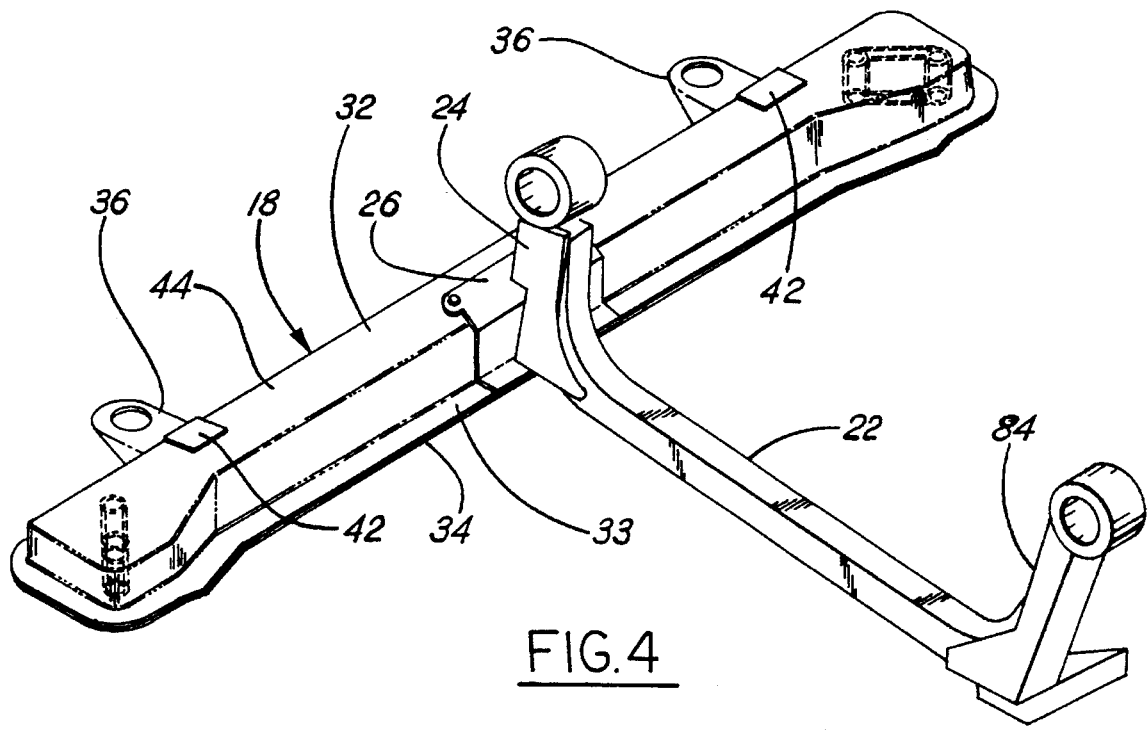
FIG. 4 is an enlarged perspective view of the invention and one supported member thereon.

FIG. 2 illustrates the front vehicle body 10 with the front crossmember assembly 18 mounted therein, and having a radiator 20 mounted on the latter. A rearwardly extending engine mount module 22 is secured at its front end mounting portion 24 by a center brace 26 (FIG. 4) secured on the crossmember assembly 18. FIG. 2 also shows the front vehicle recovery bracket 25 attached to the crossmember 18 and body 10 by fasteners 27.

Figure 3:
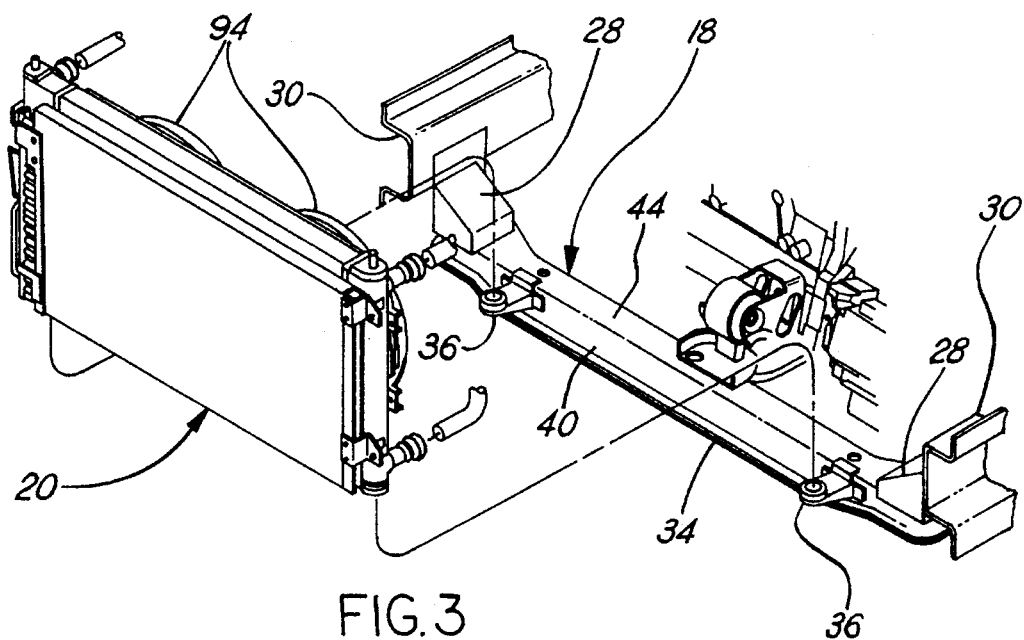
FIG. 3 is a perspective view of the invention, and related supported members.
Figure 5:
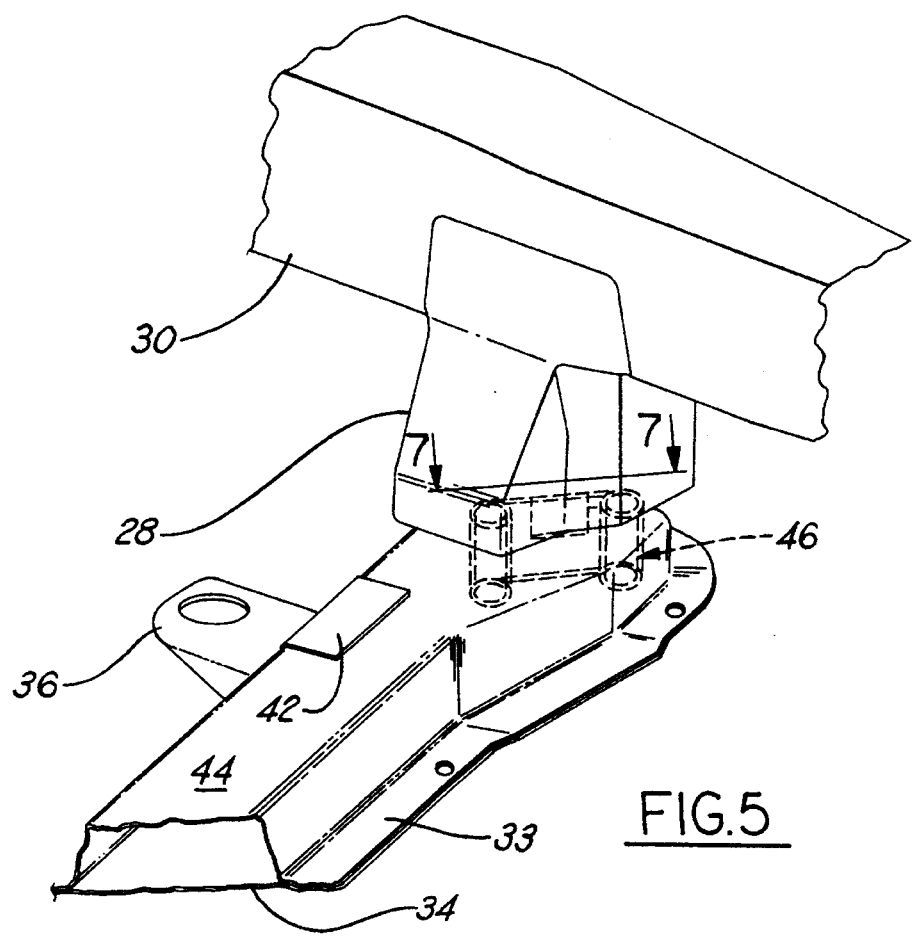
FIG. 5 is an enlarged perspective view of a portion of the FIG. 3 structure.

As shown in FIGS. 3 and 5, the front crossmember assembly 18 is supported at its ends on pedestals 28 secured to the front end portions of opposite side rails 30. The assembly 18, shown in FIG. 6, includes, as components thereof, an upper laterally extending inverted U-shaped body section or, so-called, hat section 32, having a flange 33, and closed in by a lower plate section 34; two mounting brackets 36 secured, as by spot welding inwardly a predetermined distance from respective ends of the assembly 18. Each bracket 36 includes two flanges 38 secured on the forward wall 40 of the hat member 32, and a flange 42 secured on the upper wall 44 thereof. The assembly 18 further includes three vertical spacers 4,6, located at each end and at the center of the assembly, positioned between the upper wall 44 and the plate section 34.

Figure 7:
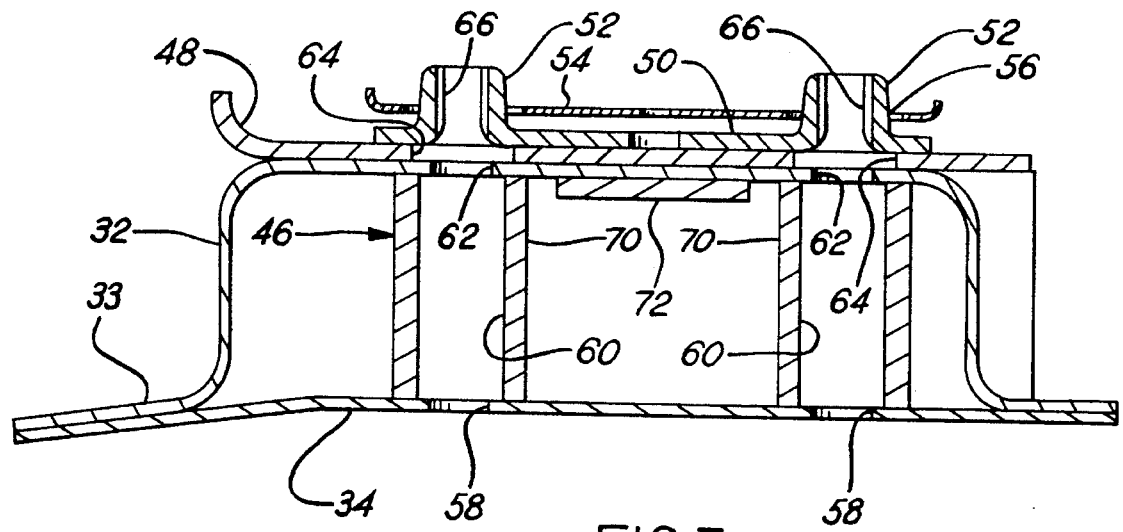
FIG. 7 is an enlarged cross-sectional view taken along the plane of the line 7—7, of FIG. 5, and looking in the direction of the arrows.

Referring now to FIG. 7, it is noted that, within the pedestal 28 (FIG. 5), there is mounted a retainer 48, against which the hat section 32 is abutted; a plate 50 on the retainer 48, having two cylindrical extrusions 52 formed thereon; and a cage 54 above the plate 50 with openings 56 around the extrusions 52. Aligned openings 58, 60, 62, 64, and 66 are formed through the lower plate section 34, the vertical spacer 46, the hat section 32, the retainer 48, and the extrusions 52, respectively.

Figure 8:
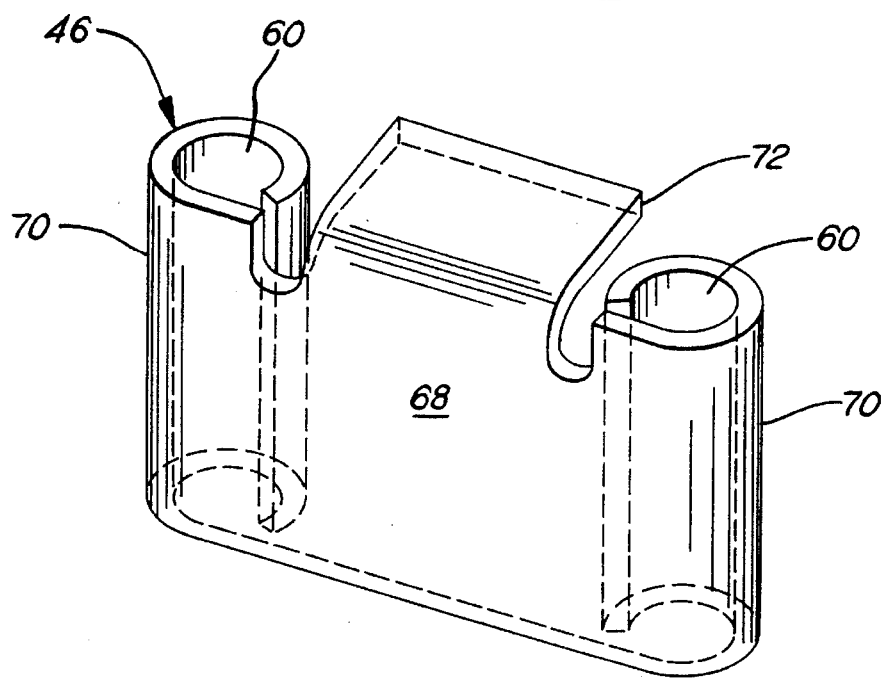
FIG. 8 is an enlarged perspective view of a component of the FIG. 7 structure.

As shown in FIG. 8, the spacer 46 is formed to include a vertical wall 68 terminating in two cylindrical end segments 70 forming the openings 60, with a horizontally extending flange 72 intermediate the end segments 70.

As indicated in FIG. 2, the fasteners 27 are extended through the aligned openings 58, 60, 62, 64, and 66 to secure the crossmember assembly 18 to the pedestal 28 and, hence, to the side rails 30 of the vehicle body 10, providing torsional stability at the front of the vehicle. As also shown in FIG. 2 and understood in FIG. 3, the radiator 20 includes oppositely disposed side mounts 76 adapted to seat on the mounting brackets 36 of the assembly 18, and become secured thereon by suitable isolated fasteners 78 (FIG. 2).

Figure 6:
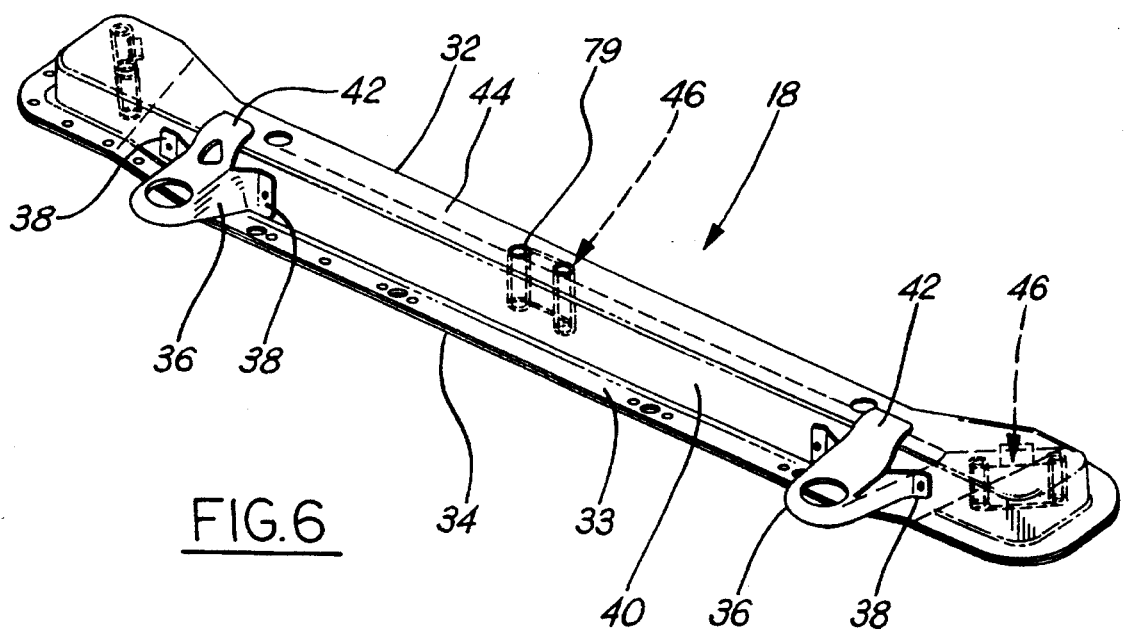
FIG. 6 is an enlarged perspective view of the invention.

As shown in FIG. 6, a pair of openings 79 are formed in the middle portion of the upper wall 44 of the hat section 32. As further shown in FIG. 2, a pair of openings 80 are formed through the middle portion of the lower plate section 34. These openings 80 are aligned with the openings 60 of the center vertical spacer 46 (FIG. 6) in the assembly 18. Further aligned openings (not shown) are formed in the upper wall 44 and the center brace 26 of the front end mounting portion 24 of the engine mount module 22. Bolts 82 (FIG. 2) extend through the openings 80, 60 and 79 and through the center brace 26 into the front end mounting portion 24 of the engine mount module 22. A rear end mounting portion 84 (FIGS. 2 and 4) on the engine mount module 22 is secured by bolts 86 (FIG. 2) through openings 88, into the middle portion of a front suspension crossmember 90.

Rather than the powertrain being built up on a traditional powertrain cradle and inserted into the engine box, the radiator crossmember assembly 18 serves to support the front end of the vehicle engine 92 and becomes the forward-most cross-car member of the powertrain cradle, and eliminates the need for a welded-in radiator crossmember, resulting in weight and parts savings.

As may be noted in FIG. 3, an engine/transmission cooling module and an air conditioning system, represented collectively as 94 is assembled outside of the vehicle body 10, and fully charged and sealed before insertion into the body 10, thus facilitating plant assembly and plant repair, if necessary, and eliminate possible need for repair under dealer warranty.

Also noted in FIG. 2, since the crossmember is bolted to the body and not welded, alternate materials may be used to make the crossmember which could provide further cost and/or weight savings, in addition to the cost and weight savings due to component reduction.

INDUSTRIAL APPLICABILITY

It should be apparent that the invention provides a novel crossmember assembly of seven stamped parts made from aluminum that are spot welded together and bolted onto the vehicle body as a unit, as opposed to being welded thereon. As such, plant assembly, repair, and service procedures are vastly facilitated.

It should be further apparent that the invention is adapted to support not only the vehicle radiator, but also the front of the engine, becoming the forward-most cross-car member of the powertrain cradle, and eliminating the need for a welded-in radiator crossmember.

The crossmember serves to support the engine/transmission cooling module and allows this system and the air conditioning system to be built-up, charged and sealed outside the vehicle body, thus facilitating plant assembly and plant repair.

Additionally, the crossmember provides the front fascia and splash shield attachments, along with providing torsional stability at the front of the vehicle.

Additionally, since the crossmember is bolted to the body and not welded to the body as is traditionally the case, alternate materials may be used to make the crossmember which could provide further cost and/or weight savings in addition to the cost and weight savings due to component reduction.

While but one embodiment of the invention has been shown and described, other modifications thereof are possible within the scope of the following claims.

What is claimed is:

1. A front crossmember assembly for a motor vehicle body and side rails including a radiator, an engine, a cooling module, front fascia, a splash shield, and a front recovery bracket, said crossmember assembly comprising an inverted U-shaped body section having closed ends and a flange formed on the peripheral edges thereof, and attachment means operatively connected to said closed ends adapted to secure said crossmember assembly to said side rails, a plurality of openings formed through said flange, and fastening means for securing said front recovery bracket, said front fascia, and said splash shield thereto.

2. The front crossmember assembly described in claim 1, and a plate section secured to the bottom surface of said flange.

3. The front crossmember assembly described in claim 2, and mounting brackets welded to the front face of said inverted U-shaped body section for having said radiator isolated thereon.

4. The front crossmember assembly described in claim 2, wherein said attachment means includes a pedestal secured to each side rail, a spacer within each of said closed ends, and fasteners through said plate section, said spacer, and said U-shaped body section opposite said plate section, for securing said crossmember assembly to said pedestals.

5. The front crossmember assembly described in claim 3, wherein said U-shaped body section, said plate section, and said mounting brackets are spot welded together.

6. The front crossmember assembly described in claim 5, and a spacer within each closed end and at a midpoint along said crossmember assembly extending between said U-shaped body section and said plate section, wherein said spacers are spot welded in place.

7. The front crossmember assembly described in claim 2, and a spacer at a midpoint along said crossmember assembly intermediate said U-shaped body section and said plate section, and at least one bolt through said plate section, said spacer, and said U-shaped body section for securing a brace thereon.

8. The front crossmember assembly described in claim 7, and a longitudinally extending engine mount module secured at its forward end to said brace.

9. The front crossmember assembly described in claim 8, and a front suspension crossmember, wherein said engine mount module is secured at its rear end to said front suspension crossmember, and said engine is supported on said module.

* * * * *